United States Patent [19]
Yonemoto

[11] Patent Number: 5,083,634
[45] Date of Patent: Jan. 28, 1992

[54] SAFETY DEVICE FOR ELEVATOR

[75] Inventor: Masashi Yonemoto, Aichi, Japan

[73] Assignee: Mitsubishi Denki Kabushiki Kaisha, Japan

[21] Appl. No.: 694,396

[22] Filed: May 1, 1991

[30] Foreign Application Priority Data
May 9, 1990 [JP] Japan ................... 2-117517

[51] Int. Cl.⁵ ............................. B66B 5/00
[52] U.S. Cl. ................... 187/109; 187/89
[58] Field of Search ............ 187/109, 89, 130; 363/39, 40

[56] References Cited

U.S. PATENT DOCUMENTS

| | | | |
|---|---|---|---|
| 3,601,227 | 8/1971 | Burch | 187/109 |
| 4,256,204 | 3/1981 | Ando et al. | 187/109 |
| 4,923,055 | 5/1990 | Holland | 187/109 |

Primary Examiner—A. D. Pellinen
Assistant Examiner—Lawrence E. Colbert
Attorney, Agent, or Firm—Leydig, Voit & Mayer

[57] ABSTRACT

A safety device for an elevator which detects a trouble of the control device quickly to apply an emergency brake, thereby to ensure the safety of the people in the cage. The elevator safety device is so designed that the harmonic wave component produced by an inverter is detected with the aid of a band-pass filter, and when the harmonic wave component thus detected becomes abnormal, an emergency stop instruction is produced.

4 Claims, 2 Drawing Sheets

SAFETY DEVICE FOR ELEVATOR

BACKGROUND OF THE INVENTION

This invention relates to a safety device for an elevator, and more particularly to an inverter type safety device for an elevator.

An ordinary elevator is so designed that, when its cage reaches an aimed floor, its door is opened before the cage is completely stopped, and that if, when the cage is stopped at the floor, it is greatly vertically shifted from the floor because the cable is extended or contracted by the movement of people going into or coming out of the cage, then the cage is moved at extremely slow speed to reduce the vertical distance between the floor and the bottom of the cage. When this operation is carried out, the door is open. Therefore, if the control device becomes out of order during the operation, people may be dropped into the gap between the floor and the cage or at worst into the elevator shaft. Thus, when the control device becomes out of order, it is necessary to apply the emergency brake to stop the cage quickly to prevent the occurrence of such danger.

FIG. 3 is a diagram showing an operating characteristic in one example of a conventional elevator safety device disclosed, for instance, by Unexamined Japanese Patent Publication No. 115044/1977. In FIG. 3, reference character A designates the point where opening the door is started, and the curve EGO represents the speed of the cage when the latter reaches its aimed floor normally. The cage stops at the point O. The cage occupies a region indicated by lengths AO and OB (hereinafter referred to as "a cage landing region", when applicable) when it reaches the floor. Further in FIG. 3, a length AC or BD indicates the upper limit value of the cage speed when the cage reaches the floor. That is, the elevator safety device is designed as follows: In the case where after the cage has passed through the point A, a trouble occurs, so that the cage speed is going to exceed the upper limit at the point F as shown by the curve EGF, upon detection of the fact that the cage speed has exceed the upper limit, an emergency stop instruction is issued to stop the cage immediately.

The conventional elevator safety device is designed as described above; that is, after the detection of the fact that the cage speed has exceeded the upper limit, the emergency stop instruction is produced. Hence, the elevator safety device suffers from a difficulty that, for the period of time of from the occurrence of the trouble until the production of the emergency stop instruction the cage speed increases and the braking distance is increased accordingly. In the case of an elevator such as a gearless elevator having a large brake device, the period of time which lapses from the time instant the emergency stop instruction is issued until the brake torque is produced, namely, a braking period of time is generally long. Therefore, there has been a strong demand to detect the occurrence of a trouble quickly for the elevator.

SUMMARY OF THE INVENTION

Accordingly, an object of the invention is to eliminate the above-described difficulties accompanying a conventional elevator safety device. More specifically, an object of the invention is to provide a safety device for an elevator which detects a trouble of the control device quickly to apply an emergency brake, thereby to ensure the safety of the people in the cage.

An elevator safety device according to the invention is so designed that the harmonic wave component produced by an inverter is detected with the aid of a band-pass filter, and when the harmonic wave component thus detected becomes abnormal, an emergency stop instruction is produced.

As was described above, in the safety device of the invention, it is detected when the harmonic wave component produced by the inverter becomes abnormal, so that immediately when a trouble occurs with the elevator, the emergency stop instruction is issued to stop the cage.

DESCRIPTION OF THE PREFERRED EMBODIMENT

Figure 1:
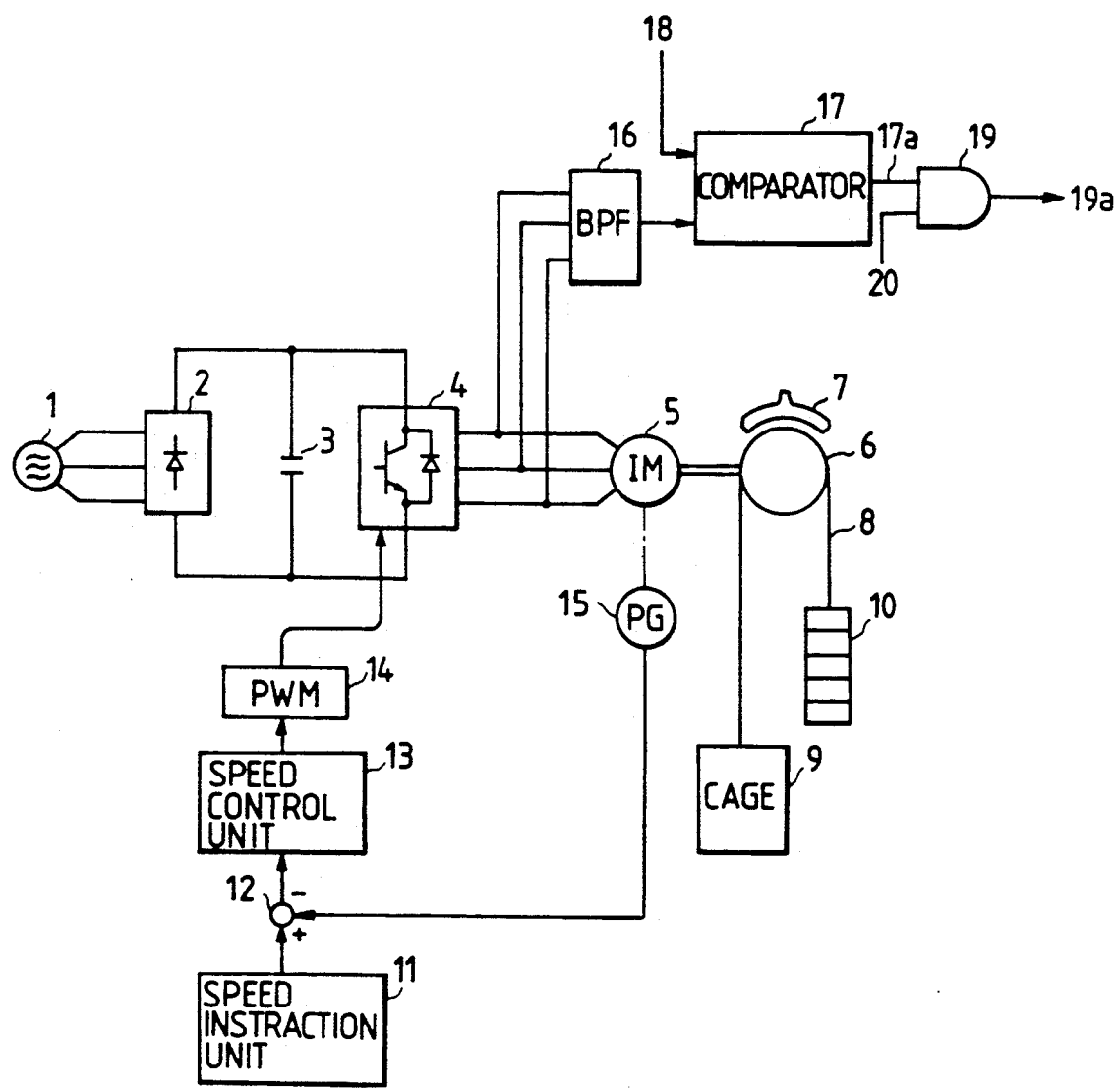
FIG. 1 is a diagram showing the arrangement of an embodiment of this invention.

FIG. 1 is a diagram showing the arrangement of an embodiment of this invention.

In FIG. 1, reference numeral 1 designates a three-phase AC power source; 2, a rectifier comprising diodes to convert alternate current into direct current; 3, a smoothing capacitor connected to the DC side of the rectifier 2; 4, an inverter including a transistor and a diode to convert direct current into three-phase alternate current variable both in voltage and in frequency; 5, an induction motor for winding up the cage of an elevator; 6, a cable wheel; 7, an electromagnetic brake for stopping the rotation of the cable wheel 6; 8, a cable; 9, the cage; and 10, a counter weight. Further in FIG. 1, reference numeral 11 designates a speed instruction unit for providing a cage speed instruction; 12, an adder; 13, a speed control unit for controlling the rotating speed of the induction motor 5; 14, a pulse width modulating unit for pulse-width modulation (PWM) of the conduction period of the transistor forming the inverter 4; 15, a tachometer generator for detecting the rotating speed of the induction motor 5; 16, a band-pass filter for transmitting only a predetermined frequency component of the output voltages of the inverter 4; 17, a comparator for comparing an output of the band-pass filter with a reference voltage 18, and for outputting an output signal 17a; 19, an AND gate which provides an emergency stop instruction signal 19a; and 20, a cage landing region detection signal.

The elevator safety device thus organized operates as follows: The output of the three-phase AC power source 1 is converted into direct current, which is smoothed by the smoothing capacitor 3 and then applied to the inverter 4. When a start instruction is applied to the cage 9, the speed instructing unit 11 operates to produce a speed instruction signal. In response to the speed instruction signal, the speed control unit 13 operates, so that an inverter output voltage instruction value is calculated. The voltage instruction value is subjected to pulse width modulation by the pulse-width modulating unit 14, the output of which is applied, as a conduction instruction signal, to the transistor in the inverter 4. As a result, the inverter 4 operates to convert direct current into alternate current variable both of voltage and frequency. The alternate current is supplied to the induction motor 5, so that the cage 9 is moved. On the other hand, the speed of the induction motor 5 is detected by the tachometer generator 15. The speed thus detected is applied to the adder 12, so as to be compared with the speed instruction signal, whereby a feedback control is carried out to control the cage movement speed with high accuracy.

Figure 2:
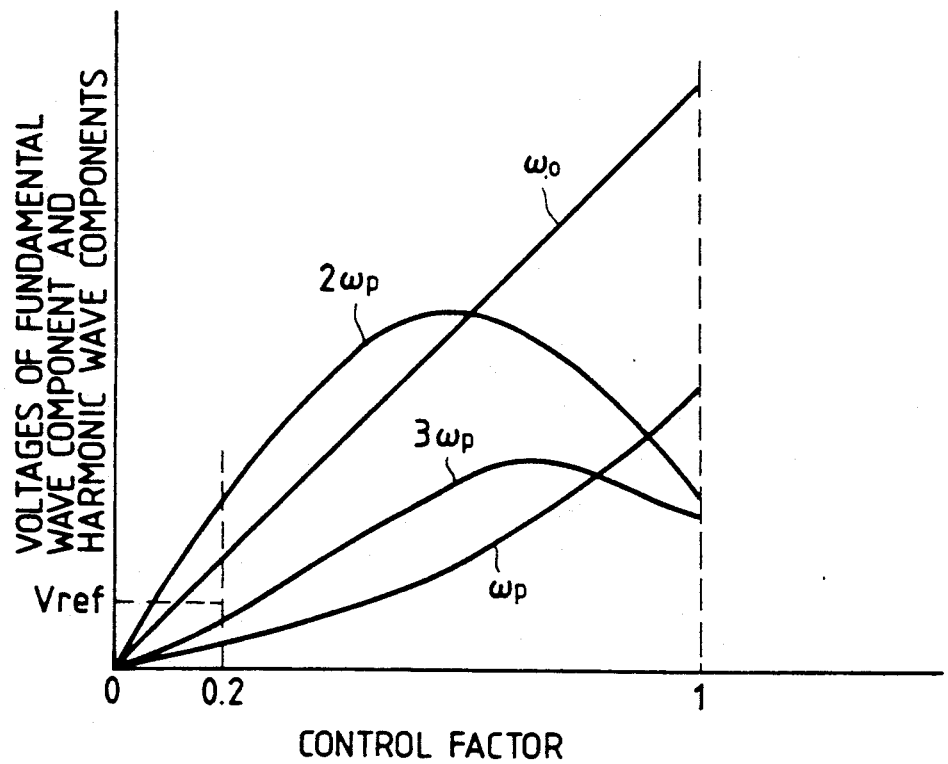
FIG. 2 is a graphical representation indicating output waveform components of an inverter employed in the embodiment.
Figure 3:
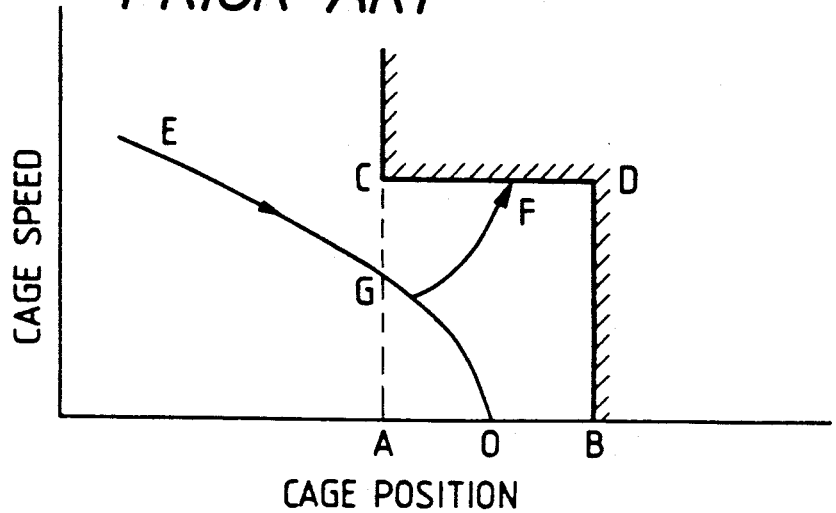
FIG. 3 is a diagram showing an operating characteristic of a conventional elevator safety device.

FIG. 2 is a graphical representation indicating output waveform components of the inverter 4. In the case where a sine wave PWM system is employed for control of the inverter, and a sine wave $e_o$ is employed as an output reference signal while a triangular wave $e_p$ as a carrier wave, the output waveform component can be represented as follows:

Angular frequency of fundamental wave component: $w_o$
Amplitude: a ($E_d/2$)
Angular frequencies of harmonic wave components: n $w_p \pm$ k $w_o$
Amplitude: (2 $E_d$/n $\pi$) $J_k$ (n $\pi a/2$)
where n is positive integral number (n $\geq$ 1), k=(n−1)
Namely, when n=1, 3, 5, ..., k=0, 2, 4, ...
And, when n=2, 4, 6, ..., k=1, 3, 5, ...
a:amplitude ratio of $e_o$ and $e_p$ (control factor) a $\leq$ 1
$E_d$:DC voltage of the smoothing capacitor 3
$w_p$:Angular frequency of the carrier wave $e_p$
$J_k$:Bessel function of k-th order In general, $w_p$ is much larger than $w_o$. Therefore, in FIG. 2, of the harmonic wave component n $w_p \pm$ k $w_o$, the component $\pm$k $w_o$ is indicated as a component n $w_p$ being combined with the component n $w_p$.

Now, the variation of the control factor during the operation of the elevator will be described. The speed of the cage 9 is substantially proportion to the output voltage of the inverter 4. That is, when the cage is at rest, the output voltage of the inverter 4 is zero, and accordingly the control factor a=0. When the cage is accelerated, the inverter voltage is gradually increased, and accordingly the control factor a is also gradually increased. When the cage speed reaches the full speed, the control factor a approaches one (1).

When the cage is in the cage landing region, the value of the control factor is as follows: In the cage landing region, the cage speed is, in general, of the order of 20 m per minute or less. Therefore, for instance in the case of an elevator whose rated speed is 105 m per minute, the control factor a is defined about 0.2 or less when the cage is in the cage landing region. This value is inversely proportional to the rated speed of the elevator. As is apparent from FIG. 2, in the range where the control factor is smaller, the harmonic wave components and the components $w_p$, $2w_p$ and $3w_p$ are substantially proportional to the control factor a. The fundamental wave component having the angular frequency $w_o$ is also proportional to the control factor a; however, it should be noted that the fundamental wave component is different from the harmonic wave components and the components $w_p$, $2w_p$ and $3w_p$ in that not only the voltage value but also the angular frequency $w_o$ itself is proportional to the control factor a.

The central frequency of the band-pass filter 16 is set to the carrier wave angular frequency $w_p$ so that, of the output voltage of the inverter, only the component $w_p$ may be detected. And, in the case of the elevator whose rated speed is 105 m per minute, the reference voltage 18 applied to the comparator 17 is set to a value $V_{ref}$ indicated in FIG. 2. In this case, when the angular frequency exceeds the value $V_{ref}$, the comparator 17 operates so that the output signal 17a is raised to "1".

With the safety device thus organized, as long as the elevator control unit operates correctly, the comparator 17 will never operates while the cage is in the cage landing region and the cage landing region detection signal 20 is at "1". However, when, during the movement of the cage in the cage landing region, the control unit becomes out of order and the angular frequency $w_p$ exceeds the reference voltage $V_{ref}$, the comparator 17 operates, so that the output signal 17a is raised to "1". In the case, the cage landing region detection signal 20 is also "1"because the cage is in the cage landing region. Therefore, the AND gate 19 operates to output the emergency stop instruction 19a. As a result, the electromagnetic brake 7 is activated to stop the cage.

In the above-described embodiment, the central frequency of the band-pass filter 16 is set to the carrier wave angular frequency $w_p$; however, the invention is not limited thereto or thereby. That is, the same effect can be obtained by setting it to other harmonic wave components such as $2w_p$ and $3w_p$.

As was described above, with the safety device of the invention, the harmonic wave component produced by the inverter is detected with the aid of the band-pass filter, and when the harmonic wave component thus detected is abnormal in quantity, the emergency stop instruction is issued. Hence, immediately when the control unit becomes out of order, the emergency stop instruction is produced; that is, the cage braking distance is shortened as much. Thus, with the safety device of the invention, the elevator is greatly improved in safety.

What is claimed is:

1. A safety device for use in an elevator in which an inverter controls the operation of an electric motor for winding up a cage thereof, said safety device comprising:

harmonic wave component detecting means for detecting a harmonic wave produced by said inverter; and means for producing an emergency stop instruction when said harmonic wave component detected by said harmonic wave component detecting means exceeds a predetermined reference voltage.

2. The safety device as claimed in claim 1, wherein said emergency stop instruction producing means includes a comparator for comparing an output of said harmonic wave component detecting means with said predetermined reference voltage, and AND logic gate for producing said emergency stop instruction from output of said comparator and a cage landing detection signal which indicates said cage of the elevator is at an aimed floor.

3. The safety device as claimed in claim 2, wherein said harmonic wave component detecting means includes a band pass filter for transmitting only a predetermined frequency component of outputs of said inverter.

4. The safety device as claimed in claim 1, wherein said harmonic wave component detecting means includes a band pass filter for transmitting only a predetermined frequency component of outputs of said inverter.

* * * * *